H. C. FENTRESS.
AUTOMOBILE STARTER.
APPLICATION FILED OCT. 21, 1919.
1,352,803.
Patented Sept. 14, 1920.
2 SHEETS—SHEET 1.
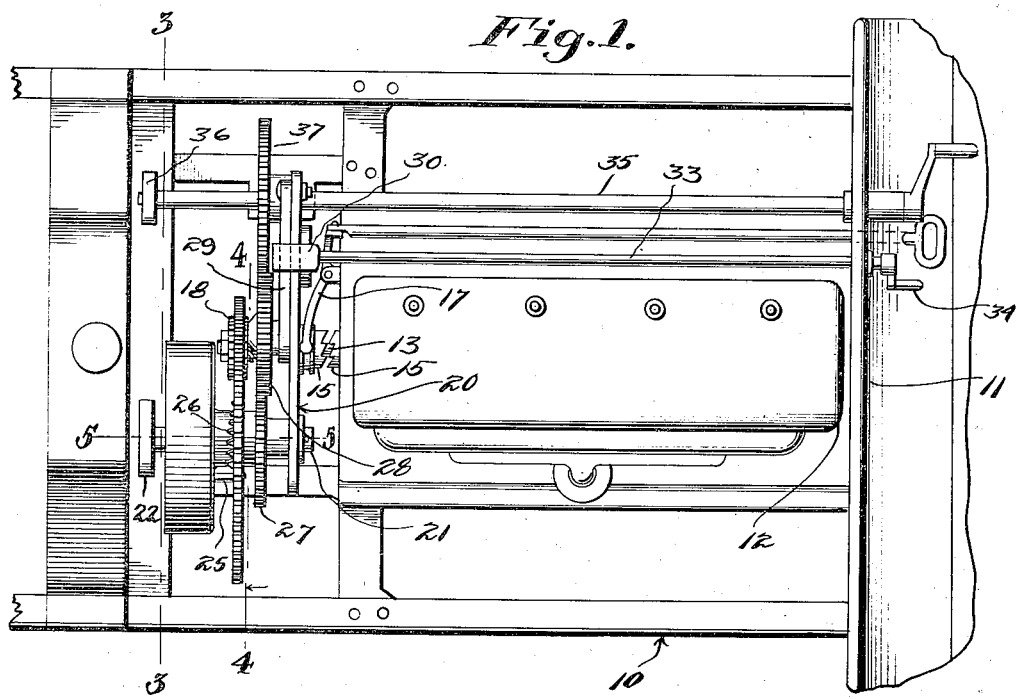
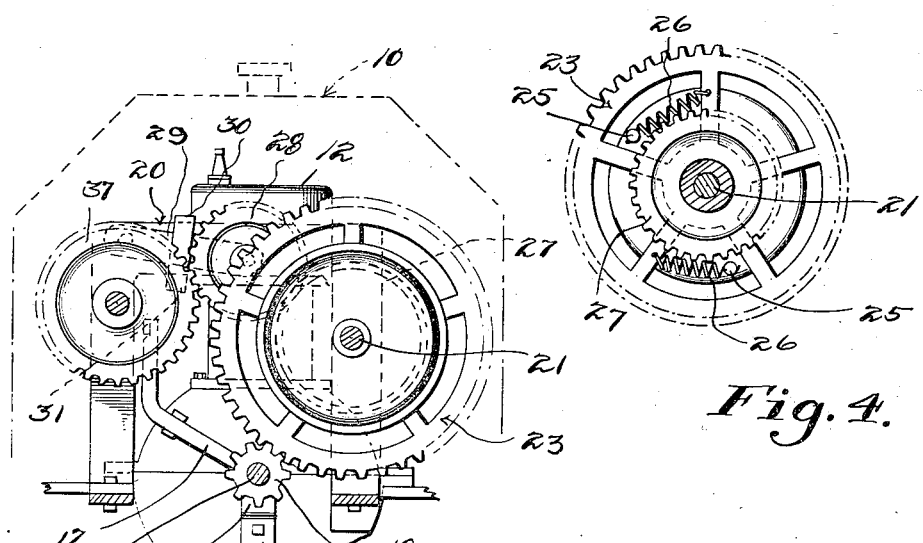
Witnesses
Inventor
H. C. Fentress
By Chandler & Chandler
Attorneys

H. C. FENTRESS.
AUTOMOBILE STARTER.
APPLICATION FILED OCT. 21, 1919.

1,352,803. Patented Sept. 14, 1920.
2 SHEETS—SHEET 2.

Inventor
H. C. Fentress
By Chandler & Chandler
Attorney

Witnesses

UNITED STATES PATENT OFFICE.

HENRY C. FENTRESS, OF GLEN DEAN, KENTUCKY.

AUTOMOBILE-STARTER.

1,352,803.  Specification of Letters Patent.  Patented Sept. 14, 1920.

Application filed October 21, 1919. Serial No. 332,334.

*To all whom it may concern:*

Be it known that I, HENRY C. FENTRESS, a citizen of the United States, residing at Glen Dean, in the county of Breckinridge, State of Kentucky, have invented certain new and useful Improvements in Automobile-Starters; and I do hereby declare the following to be a full, clear, and exact description of the invention, such as will enable others skilled in the art to which it appertains to make and use the same.

This invention is an improvement in internal combustion engines and has particular reference to a starting device therefor.

This application is substituted for the abandoned application Serial No. 222642.

An object of the invention is to provide improved means, operable from the driver's seat of a motor vehicle, for rotating the shaft of an engine with sufficient speed to start the same and, to this end, use is preferably made of a train of gearing connecting the engine shaft with a crank positioned near the driver's seat, said gearing having novel means associated therewith for rendering the same operative and inactive and also means for maintaining the momentum of a portion of the engine shaft and relieve the strain of shock which is placed on the gearing when said portion of the shaft is adjusted into engagement with the main portion thereof.

Another object is to provide a starting device of this character which is simple in construction, easy to manufacture, durable and which is effective in carrying out the purpose for which it is designed.

The inventive idea involved is capable of receiving a variety of mechanical expressions one of which for the purpose of illustrating the invention, is shown in the accompanying drawings wherein:—

Figure 1 is a top plan view of an automobile engine and certain parts of the vehicle showing the invention applied thereto.

Fig. 3 is a transverse section on the line 3—3 of Fig. 1.

Fig. 4 is a transverse section on the line 4—4 of Fig. 1.

Figure 2:
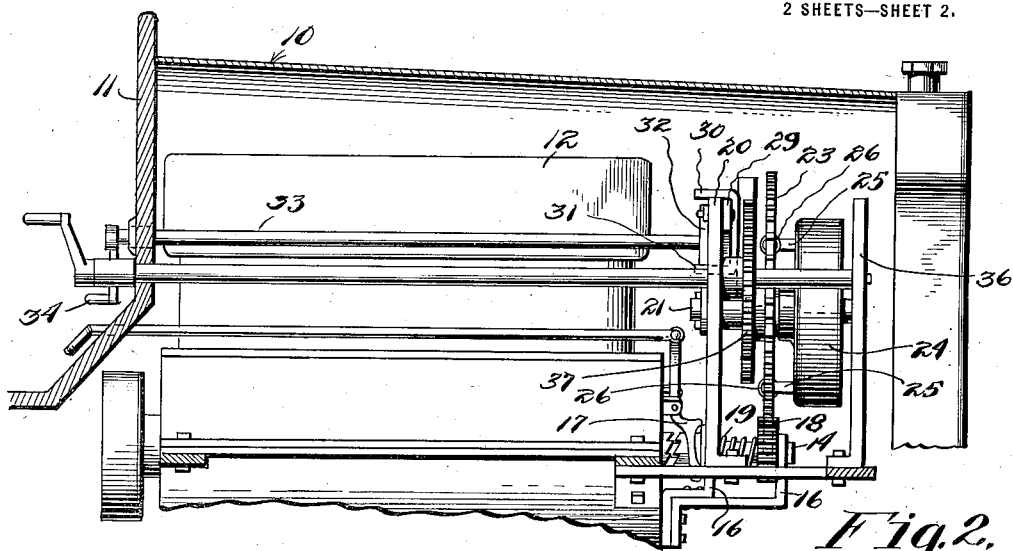
Fig. 2 is a side elevation with certain of the parts of the vehicle removed.
Figure 6:
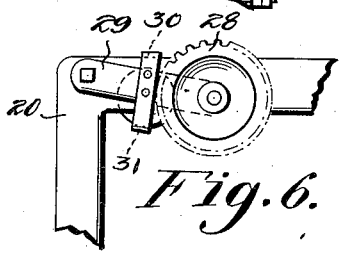
Fig. 6 is an elevational view of the means for rendering the train of gearing operative and inactive.
Figure 5:
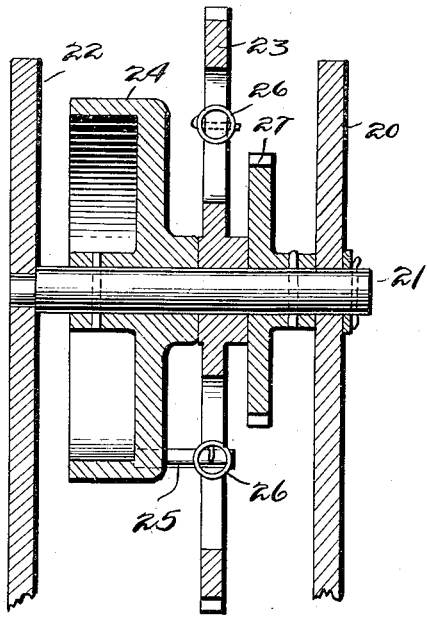
Fig. 5 is a section on the line 5—5 of Fig. 1.
Figure 7:
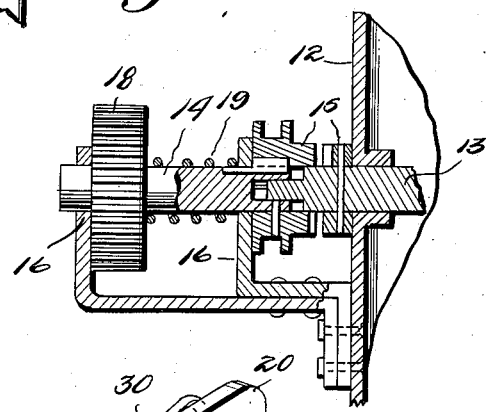
Fig. 7 is an enlarged sectional view of the sections of the engine shaft.
Figure 8:
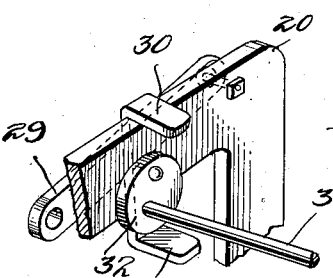
Fig. 8 is a perspective view of an adjusting device of the means shown in Fig. 6.

Referring more particularly to the drawings, the numeral 10 indicates generally a motor vehicle having the usual dash board 11 and engine 12 which may be of any preferred construction and which is only conventionally shown. The crank shaft of the engine is made in sections 13 and 14 having adjacent ends thereof provided with coöperating clutch faces 15, the section 14 being adjustable longitudinally with respect to the other section and mounted in bearings 16. Connected to the section 14 of the shaft is a shipper element 17 which is extended rearwardly and through the dash board 11 so as to be within reach of the driver's seat to permit of said section of the shaft being adjusted into engagement with the section 13 after the mechanism presently to be described has been started. The portion of the section 14 of the shaft between the bearings 16 has mounted thereon a pinion 18 and interposed between one end of the pinion and the adjacent bearing 16 is a coil spring 19 which normally maintains the section 14 out of engagement with the section 13 and thus prevents coöperation of the clutch faces 15.

A vertically disposed supporting or bearing frame 20 of substantially inverted U-shaped formation is arranged transversely of the crank shaft and has mounted in one side thereof one end of a stub shaft 21 the other end of which is journaled in a bearing 22 and this shaft has loosely mounted thereon a large gear wheel 23 which meshes with the pinion 18 and relative to which the said pinion is adjustable, the teeth thereof remaining in mesh at all times with those of said gear wheel. The shaft 21 also has mounted thereon, forwardly of the gear wheel 23, a fly wheel 24 having a pair of abutment lugs 25 extending from the rear face thereof, said lugs being connected to certain of the spokes of the gear 23 by the coil springs 26. From this description, it will be apparent when the fly wheel 24 is initially rotated, by the means to be presently described, the same will have a relative movement with respect to the gear wheel 23 which will compress the springs 26 and this compression will exert a push upon the gear wheel and start the rotation thereof. The provision of this fly wheel is also adapted to give to the section 14 of the crank shaft a rapid initial rotation. After the section 14 is rotating at the desired speed, the shipper 17 may be operated to engage the clutch faces 15 so that the rotation of the section 14 will be imparted to the section 13. It will of course be understood that when the clutch faces 15 engage, the speed of rotation of the section 14 will momentarily have a tendency to be decreased and similarly effect the rotation of the gear wheel 23 and cause a relative rotary movement between the same and the fly wheel and due to the momentum of the latter the lugs 25 thereof will cause the springs 26 to again be compressed and exert a pressure upon the gear wheel 23 and maintain its speed of rotation with a consequent normal speed of rotation of the section 14. It will also be apparent that the action of the springs 26 will absorb the shock or strain placed upon the gearing, presently to be described, by the sudden engagement of the clutch faces 15.

The mechanism for rotating shaft 21 preferably comprises a small gear 27 mounted on said shaft and meshing with another gear 28 which is adjustable toward and away from said gear 27 for the purpose of operatively connecting said shaft with the actuating mechanism and disconnecting the same therefrom. In order that the gear 28 may be made adjustable, the same is mounted on one end of a pivoted supporting or bearing arm 29 the other end of which is connected to the upper portion of the frame 20 and extending rearwardly from said arm and intermediate its ends is a pair of upper and lower contacts 30 and 31 adapted to be engaged by an eccentrically mounted disk 32 carried upon a shaft 33 which extends rearwardly through the dash board and is provided with a handle 34 whereby to rotate said disk to cause the periphery thereof to engage either of the contacts 30 or 31. When the disk is adjusted into engagement with the lower contact 31, the free end of the arm 29 is permitted to lower and thus cause the gear 28 to engage the gear 27 and when it is desired to throw the shaft 21 out of operation the shaft 33 may be rotated to cause the periphery of the disk 32 to engage the upper contact which will lift the arm and consequently the gear 28 out of engagement with said gear 27.

The gearing for rotating the shaft 21 further comprises a crank shaft 35 having its rear end mounted in the dash board and its forward end in the frame 20 and bearing 36 and this shaft carries another gear 37 which meshes at all times with the gear 28 so that when the shaft 35 is rotated by the operator the movement will be transmitted through the several gears to the shaft 21 and consequently to the section 14 of the engine shaft. The shipper may then be operated to cause engagement between the clutch faces 15 so that the section 13 will be rotated with the engine and upon the release of said shipper the spring 19 will return the section 14 to its normal position.

It will be understood that by reason of the fact that the gear wheel 23 is loose on the shaft 21, and is connected with the fly wheel through the medium of the springs 26 and lugs 25, and the fly wheel being fixed to the shaft 21, there is a cushion provided between the wheel 23 and the shaft 21 so that excessive jars incident to operative engagement of pinion 18 with the wheel 23, are avoided.

What is claimed is:

1. In an engine starter, the combination of a sectional engine shaft, one of the sections is normally disconnected from the other and adjustable into engagement therewith, a train of gearing operatively connected to the first named section for rotating the same, means for shifting one of the gears into and out of operative connection with the others, means for operating said train of gearing when the gears thereof are in operative relation, and a fly wheel yieldably connected to one of said gears.

2. In an engine starter, the combination of a sectional engine shaft, one of the sections is normally disconnected from the other and adjustable into engagement therewith, a train of gearing operatively connected to the first named section for rotating the same, means for shifting one of the gears into and out of operative connection with the others, means for operating said train of gearing when the gears therefor are in operative relation, a fly wheel associated with one of the said gears and having abutments extending from one face thereof, and coil springs connecting said abutments with the spokes of said gear.

3. In an engine, the combination of a sectional shaft, one of the sections of which is normally disconnected from the other and adjustable into engagement therewith, a train of gearing operatively connected to the first named section for rotating the same, a pivoted element for supporting one of the gears of said train of gearing, means engageable with said pivoted element to adjust said gear into and out of operative relation with the other gears of the train of gearing and means for operating said train of gearing when the gears thereof are in operative relation.

4. In an engine, the combination of a sectional engine shaft, one of the sections of which is normally disconnected from the other and adjustable into engagement therewith, a train of gearing operatively connected to the first named section for rotating the same, a pivoted element for supporting one of the gears of said train of gearing and having contact members, an eccentric disk operatively associated with said contact members, to engage the same whereby to adjust said gear into and out of operative connection with the other gears of said train of gearing and means for operating said train of gearing when the gears are in operative relation.

In testimony whereof, I affix my signature, in the presence of two witnesses.

HENRY C. FENTRESS.

Witnesses:
C. L. WILLIAMSON,
W. H. WILLIAMSON.